US008815359B2

(12) United States Patent  
Mitadera (10) Patent No.: US 8,815,359 B2
(45) Date of Patent: Aug. 26, 2014

(54) MULTILAYERED CONTAINER, DIE FOR MULTILAYERED CONTAINER, AND METHOD FOR PRODUCING MULTILAYERED CONTAINER

(75) Inventor: Jun Mitadera, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/642,367

(22) PCT Filed: Apr. 15, 2011

(86) PCT No.: PCT/JP2011/059443
§ 371 (c)(1),
(2), (4) Date: Nov. 30, 2012

(87) PCT Pub. No.: WO2011/132622
PCT Pub. Date: Oct. 27, 2011

(65) Prior Publication Data
US 2013/0095265 A1 Apr. 18, 2013

(30) Foreign Application Priority Data

Apr. 23, 2010 (JP) .................. 2010-099679

(51) Int. Cl.
*B29D 22/00* (2006.01)
*B65D 1/02* (2006.01)
*B65D 1/40* (2006.01)
*B29B 11/08* (2006.01)

(52) U.S. Cl.
CPC .............. *B65D 1/0215* (2013.01); *B29B 11/08* (2013.01); *B65D 1/40* (2013.01)
USPC ....... 428/36.6; 428/36.7; 428/36.91; 264/512

(58) Field of Classification Search
CPC ................. B29B 11/08; B29B 11/14; B29B 2911/14053; B29B 2911/14066; B29B 2911/1408; B29B 2911/14093; B29B 2911/1412; B29B 2911/14126; B29B 2911/14146; B29B 2911/14153; B29B 2911/14593; B29B 2911/1464; B29K 2025/00; B29K 2027/06; B29K 2067/043; B29K 2069/00; B29K 2077/00; B29K 2105/0026; B29K 2105/0032; B29K 2105/0038; B29K 2105/0044; B29K 2105/005; B29K 2105/16; B29K 2105/258; B65D 1/0215; B65D 1/40; B65D 81/24; B29C 45/0046; B29C 45/13; B29C 45/1646; B32B 1/02
USPC .................. 428/36.6, 36.7, 36.8, 36.9, 36.91; 220/62.22, 62.11; 264/512
See application file for complete search history.

(56) References Cited

U.S. PATENT DOCUMENTS

| | | | |
|---|---|---|---|
| 3,825,036 A * | 7/1974 | Stent ............................. | 138/174 |
| 6,344,249 B1 | 2/2002 | Maruyama et al. | |
| 6,528,137 B2 * | 3/2003 | Franosch et al. ............ | 428/36.9 |
| 8,211,520 B2 * | 7/2012 | Abe et al. .................... | 428/36.9 |
| 8,309,191 B2 * | 11/2012 | Wang et al. .................. | 428/36.7 |
| 8,343,604 B2 * | 1/2013 | Sugai et al. .................. | 428/36.6 |
| 8,551,589 B2 * | 10/2013 | Hutchinson et al. ......... | 428/35.7 |
| 2008/0317989 A1 | 12/2008 | Abe et al. | |
| 2011/0180509 A1 * | 7/2011 | Hutchinson et al. ......... | 215/12.1 |
| 2013/0095265 A1 * | 4/2013 | Mitadera .................... | 428/36.7 |

FOREIGN PATENT DOCUMENTS

| | | |
|---|---|---|
| JP | 63 99918 | 5/1988 |
| JP | 11 165330 | 6/1999 |
| JP | 2000 254963 | 9/2000 |
| JP | 2001 504763 | 4/2001 |
| JP | 2001 206336 | 7/2001 |
| JP | 2004 330672 | 11/2004 |
| JP | 2006 334849 | 12/2006 |

OTHER PUBLICATIONS

International Search Report Issued May 24, 2011 in PCT/JP11/59443 Filed Apr. 15, 2011.

* cited by examiner

Primary Examiner — N. Edwards
(74) Attorney, Agent, or Firm — Oblon, Spivak, McClelland, Maier & Neustadt, L.L.P.

(57) ABSTRACT

Provided is a multi-layer container excellent in delamination resistance and gas barrier property, which can be manufactured without employing any molding method involving a special apparatus, which increases a production cost, and a complicated step. Specifically, the multi-layer container includes a laminate structure of three or more layers having at least a gas barrier layer between an innermost layer and an outermost layer, in which the gas barrier layer in a site formed of the laminate structure has a portion having a thickness 0.01 to 0.9 times as large as the maximum thickness of the gas barrier layer. Further, provided are a mold suitable for manufacturing the multi-layer container, and a manufacturing method for a multi-layer container using the mold.

14 Claims, 4 Drawing Sheets

MULTILAYERED CONTAINER, DIE FOR MULTILAYERED CONTAINER, AND METHOD FOR PRODUCING MULTILAYERED CONTAINER

CROSS-REFERENCE TO RELATED APPLICATIONS

This application is a National Stage of PCT/JP2011/059443 filed on Apr. 15, 2011. This application is based upon and claims the benefit of priority to Japanese Application No. 2010-099679 filed on Apr. 23, 2010.

BACKGROUND OF THE INVENTION

1. Field of the Invention

The present invention relates to a multi-layer container in which delamination is suppressed and which is excellent in gas barrier property, a mold suitable for manufacturing the multi-layer container, and a manufacturing method for a multi-layer container using the mold.

2. Description of the Related Art

At present, a multi-layer container such as a plastic container mainly made of polyester such as polyethylene terephthalate (PET) is widely used for tea, a fruit juice beverage, a carbonated beverage, and the like. The percentage of a small plastic container in the plastic container is increasing year by year. A reduction in container size increases a surface area per unit volume. Hence, as the plastic container becomes smaller in size, the shelf life of contents tends to become shorter. Further, in recent years, the plastic container has been used for a container for beer, which is liable to be affected by oxygen and light, and a plastic bottle has also been used as a container for hot tea. Thus, the utilization range of the plastic container is on an increasing trend. Accordingly, there is a demand for an additional improvement in gas barrier property of the plastic container.

In order to deal with the above-mentioned demand, a multi-layer container or a blend container using a thermoplastic polyester resin and a gas barrier resin, or a barrier coated container obtained by subjecting a single-layer bottle made of a thermoplastic polyester resin to carbon coating, vapor deposition, or barrier resin coating have been developed as a method of imparting gas barrier property to a multi-layer container.

As for one example of the multi-layer container, a container obtained by using a thermoplastic polyester resin such as PET as a resin for forming each of an innermost layer and an outermost layer and using a thermoplastic resin having gas barrier property such as poly-m-xylylene adipamide (called polyamide MXD6) as a resin for forming an inner layer, and injecting those resins simultaneously or successively to fill a mold cavity, molding a preform (parison) structure having three layers or five layers, and further subjecting the resultant preform to biaxial stretch blow molding has been put in practical use.

In addition, a resin having an oxygen scavenging function of scavenging oxygen in a container while blocking oxygen from the outside of the container has been developed and applied to the multi-layer container. There has been developed, as an oxygen scavenging container, a multi-layer container using, in a gas barrier layer, a "polyamide MXD6 resin" (manufactured by MITSUBISHI GAS CHEMICAL COMPANY, INC.) composition mixed with a transition metal-based catalyst in view of oxygen absorption rate, transparency, strength, moldability, and the like.

The above-mentioned multi-layer container is utilized as a container for beer, tea, a carbonated beverage, or the like because of its satisfactory gas barrier property. The multi-layer container is used for those applications to achieve the quality control of contents and the improvement of shelf-life. However, there is a problem in that delamination occurs between different resins, for example, between each of an innermost layer and an outermost layer and a gas barrier layer, resulting in a decrease in commercial value.

As for a method of solving such problem, Patent Document 1 describes that delamination is improved by, during finally injecting a resin for forming each of an innermost layer and an outermost layer into a mold cavity, interposing a crude mixed resin between layers using a back flow control apparatus capable of allowing a predetermined amount of the resin to flow backward to the side of a gas barrier layer, thereby preparing a preform. Further, Patent Document 2 describes a method including subjecting a preform to heat shrinkage during secondary molding and then blowing the resultant under high pressure again.

PRIOR ART DOCUMENT

Patent Document

Patent Document 1: Japanese Patent Application Laid-open No. 2000-254963
Patent Document 2: Japanese Patent Application Laid-open No. 2001-206336

SUMMARY OF THE INVENTION

Problems to be Solved by the Invention

However, the method described in Japanese Patent Application Laid-open No. 2000-254963 has a problem in that a production cost is increased because a special back flow control apparatus is used. Meanwhile, the molding method including subjecting a preform to heat shrinkage and then blowing the resultant under high pressure, such as the method described in Japanese Patent Application Laid-open No. 2001-206336, has a problem in that the formativeness is poor, the shape of a molded article is inferior, and the method involves a complicated step.

An object of the present invention is to provide a multi-layer container excellent in delamination resistance and gas barrier property, which can be manufactured without employing any molding method involving a special apparatus, which increases a production cost, and a complicated step, a mold suitable for manufacturing the multi-layer container, and a manufacturing method for a multi-layer container using the mold.

Means for Solving the Problems

The present invention relates to the following items [1] to [13].
[1] A multi-layer container, including a laminate structure of three or more layers having at least a gas barrier layer between an innermost layer and an outermost layer, in which
the gas barrier layer in a site formed of the laminate structure has a portion having a thickness 0.01 to 0.9 times as large as a maximum thickness of the gas barrier layer.
[2] The multi-layer container according to the above-mentioned item [1], in which the mass of the site formed of the laminate structure accounts for 30 mass % or more of an entire multi-layer container.

[3] The multi-layer container according to the above-mentioned item [1] or [2], in which the laminate structure comprises a laminate structure of three layers or five layers.

[4] The multi-layer container according to any one of the above-mentioned items [1] to [3], in which the gas barrier layer is formed of at least one kind of component selected from a polyamide resin, a m-xylylene group-containing polyamide resin, an ethylene-vinyl acetate copolymer resin, a polyacrylonitrile resin, a polyvinylidene chloride resin, and polyglycolic acid.

[5] The multi-layer container according to the above-mentioned item [4], in which the polyamide resin comprises a m-xylylene group-containing polyamide resin.

[6] The multi-layer container according to any one of the above-mentioned items [1] to [5], in which the laminate structure comprises an innermost layer and an outermost layer each formed of at least one kind of component selected from a thermoplastic polyester resin, a thermoplastic copolymer polyester resin, a polyolefin-based resin, an aliphatic polyamide resin, a polycarbonate resin, a polyacrylonitrile resin, a polyvinyl chloride resin, and a polystyrene resin.

[7] The multi-layer container according to any one of the above-mentioned items [1] to [6], in which the multi-layer container comprises a bottle body.

[8] A mold for a multi-layer container, including:
 a cold-half portion (I) including a cavity; and
 a hot-half portion (II) including a first resin flow path for connecting the interior of a first injection cylinder to the cavity, a second resin flow path for connecting the interior of a second injection cylinder to the cavity, and a junction portion of the first resin flow path and the second resin flow path, in which
 the junction portion included in the hot-half portion (II) is positioned upstream of a gate portion opened to the cavity included in the cold-half portion (I), and the second resin flow path includes means for partially inhibiting a resin flow.

[9] The mold for a multi-layer container according to the above-mentioned item [8], in which:
 the means for partially inhibiting a resin flow comprises means for providing a convex portion in at least one part in the second resin flow path; and
 a longest portion in a diameter direction and a longest portion in a circumferential tangential direction of a cross-section in a direction vertical to a flow direction of the second resin flow path have a length of a mm and a length of b mm, respectively, a and b satisfying the following relationships:

$$0.01r \leq a \leq 1r \quad \text{(Expression 1); and}$$

$$0.01r \leq b \leq 1r \quad \text{(Expression 2)}$$

where r represents a radius (mm) of the second resin flow path.

[10] The mold for a multi-layer container according to the above-mentioned item [8] or [9], in which the means for partially inhibiting a resin flow comprises means for providing a convex portion in at least two sites in the second resin flow path.

[11] The mold for a multi-layer container according to any one of the above-mentioned items [8] to [10], in which the convex portion is provided between 0 cm to 5 cm upstream of the junction portion of the first resin flow path and the second resin flow path.

[12] A manufacturing method for a multi-layer container including a laminate structure of three or more layers having at least a gas barrier layer between an innermost layer and an outermost layer, in which the gas barrier layer in a site formed of the laminate structure has a portion having a thickness 0.01 to 0.9 times as large as a maximum thickness of the gas barrier layer,
 the method including
 carrying out molding using the mold according to any one of the above-mentioned items [8] to [11].

[13] A manufacturing method for a multi-layer container including a laminate structure of three or more layers having at least a gas barrier layer between an innermost layer and an outermost layer, in which the gas barrier layer in a site formed of the laminate structure has a portion having a thickness 0.01 to 0.9 times as large as a maximum thickness of the gas barrier layer,
 the method including:
 forming a multi-layer preform using the mold according to any one of the above-mentioned items [8] to [11]; and then
 blow molding the multi-layer preform.

Effects of the Invention

The multi-layer container of the present invention is excellent in delamination resistance and gas barrier property. In addition, delamination can be circumvented even when the multi-layer container is not formed into a shape having little uneven and bending portions, which allows a degree of freedom of a container shape to be increased.

Further, a mold for a multi-layer container according to the invention of the present application may be used to manufacture the multi-layer container without using any molding method involving a special apparatus, which increases a production cost, and a complicated step.

BRIEF DESCRIPTION OF THE DRAWINGS

In the accompanying drawings.

DETAILED DESCRIPTION OF THE PREFERRED EMBODIMENTS

Multi-Layer Container

A multi-layer container of the present invention is a multi-layer container, including a laminate structure of three or more layers having at least a gas barrier layer between an innermost layer and an outermost layer, in which the gas barrier layer in a site formed of the laminate structure has a site (hereinafter, sometimes referred to as "concave portion of the gas barrier layer") having a thickness ($t_1$) 0.01 to 0.9 times as large as the maximum thickness ($t_0$) of the gas barrier layer.

The gas barrier layer has a concave portion having a thickness 0.9 times or less (0.01 to 0.9 times as long as the gas barrier layer is continuous) as large as the maximum thickness ($t_0$) of the gas barrier layer, and hence delamination is effectively suppressed in the multi-layer container. From this viewpoint, the gas barrier layer has a concave portion having a thickness preferably 0.01 to 0.8 times, more preferably 0.02 to 0.7 times, still more preferably 0.03 to 0.6 times, particularly preferably 0.05 to 0.5 times as large as the maximum thickness of the gas barrier layer. The position of the concave portion of the gas barrier layer is not particularly limited. However, from the viewpoint of additionally enhancing delamination resistance, it is recommended that at least one, preferably two or more (about 2 to 15), more preferably three or more (about 3 to 10), still more preferably four or more (about 4 to 8) concave portions exist in a cross-section in the case of horizontally cutting the multi-layer container into round slices. When a plurality of concave portions exist in the cross-section in the case of horizontally cutting the multi-layer container into round slices, the $t_1/t_0$ ratios of the respective concave portions may be identical to or different from each other.

In the multi-layer container of the present invention, the laminate structure having a gas barrier layer is of preferably three layers or five layers. The mass of the site formed of the laminate structure accounts for, from the viewpoint of making the gas barrier property of the multi-layer container satisfactory, preferably 30 mass % or more, more preferably 40 mass % or more, still more preferably 50 mass % or more, yet still more preferably 60 mass % or more, even yet still more preferably 70 mass % or more, particularly preferably 80 mass % or more of the entire multi-layer container.

In the multi-layer container, the outermost layer, the innermost layer, and the respective layers excluding the gas barrier layer each have a thickness of preferably 0.01 to 2 mm, more preferably 0.05 to 1.5 mm, and the gas barrier layer has a thickness of preferably 0.005 to 0.2 mm (5 to 200 µm), more preferably 0.01 to 0.15 mm (10 to 150 µm). Further, the thickness of the multi-layer container is not necessarily constant in the entire bottle but generally falls within the range of preferably about 0.2 to 4 mm.

In the multi-layer container of the present invention, the mass of the gas barrier layer is preferably 1 to 20 mass % with respect to the total mass of the site formed of the laminate structure having a gas barrier layer. When the mass falls within the above-mentioned range, satisfactory gas barrier property is obtained and the molding of a multi-layer preform as a precursor into a multi-layer container is facilitated. From this viewpoint, the mass of the gas barrier layer is more preferably 2 to 15 mass %, still more preferably 3 to 10 mass % with respect to the total mass of the site formed of the laminate structure having a gas barrier layer.

The multi-layer container of the present invention is excellent in delamination resistance and gas barrier property and is hence useful for a container for a liquid beverage, a liquid food, or the like. The shape is not particularly limited but is preferably a bottle body.

(Components of Layers Excluding Gas Barrier Layer)

Components for forming layers (including an outermost layer and an innermost layer) excluding the gas barrier layer contained in the multi-layer container of the present invention are not particularly limited and components to be used for a multi-layer container such as a beverage container may be used. Examples of the components for forming layers excluding the gas barrier layer include: a thermoplastic polyester resins such as polyethylene terephthalate (PET), polylactic acid (PLA), or polyethylene-2,6-naphthalate (PEN); a thermoplastic copolymer polyester resin; a polyolefin-based resin; an aliphatic polyamide resin; a polycarbonate resin; a polyacrylonitrile resin; a polyvinyl chloride resin; and a polystyrene resin. One kind of those components may be used alone, or two or more kinds thereof may be used in combination. The combination of two or more kinds is, for example, a blend of PET and PEN. Of those, a polyester resin (hereinafter, referred to as "polyester (A)") is preferred. It should be noted that it is not denied that the outermost layer, the innermost layer, and any of the other layers each have gas barrier property, all of the layers may have gas barrier property, but in general, a form in which the gas barrier layer is sandwiched between the above-mentioned components is adopted for the viewpoint of production cost or the like.

Polyethylene terephthalate (PET) and polylactic acid (PLA) are each suitably used as the polyester (A). Of those, polyethylene terephthalate is more preferred because it exhibits excellent characteristics in all of transparency, mechanical strength, injection moldability, and stretch blow moldability.

Here, the term "polyethylene terephthalate" generally means polyester in which terephthalic acid accounts for 80 mol % or more, preferably 90 mol % or more of a dicarboxylic acid component, and ethylene glycol accounts for 80 mol % or more, preferably 90 mol % or more of a diol component. There may be used, as the remaining acid component excluding terephthalic acid, isophthalic acid, diphenyl ether-4,4-dicarboxylic acid, naphthalene-1,4-dicarboxylic acid, naphthalene-2,6-dicarboxylic acid, adipic acid, sebacic acid, decane-1,10-dicarboxylic acid, and hexahydroterephthalic acid. Further, there are given, as the remaining diol component excluding ethylene glycol, propylene glycol, 1,4-butanediol, neopentyl glycol, diethylene glycol, cyclohexanedimethanol, 2,2'-bis(4-hydroxyethoxyphenyl)propane, 2,2-bis(4-hydroxyethoxyphenyl)propane, and the like. In addition, an oxyacid such as p-oxybenzoic acid may also be used as a raw material monomer for the thermoplastic polyester resin.

The polyester (A) has an intrinsic viscosity of preferably 0.55 to 1.3, more preferably 0.65 to 1.2, still more preferably 0.70 to 0.9. When the intrinsic viscosity is 0.55 or more, the multi-layer preform can be obtained in a transparent amorphous form and the resultant multi-layer container also has satisfactory mechanical strength. When the intrinsic viscosity is 1.3 or less, bottle molding is carried out easily without impairing flowability during the molding. It should be noted that the intrinsic viscosity (η) was measured using a mixed solvent of phenol/tetrachloroethane=6/4 (mass ratio). It should be noted that the intrinsic viscosity is determined, for example, by ASTM D4603-03 or ASTM D1601.

It is preferred that the outermost layer or the innermost layer of the multi-layer container of the present invention be mainly formed of the polyester (A). However, a product obtained by blending the polyester (A) with other thermoplastic resins and various additives in such a range that the feature of the present invention is not impaired may be used. In that case, it is preferred that 90 mass % or more of the outermost layer or the innermost layer be made of the polyester (A).

Examples of the other thermoplastic resins include a thermoplastic polyester resin such as polyethylene-2,6-naphthalenedicarboxylate, a polyolefin-based resin, polycarbonate, polyacrylonitrile, polyvinyl chloride, and polystyrene.

Further, examples of the additives include a UV absorbent, an oxygen absorbent, a colorant, and an infrared absorbent (reheat additive) for shortening a cycle time at the time of molding through the acceleration of heating of a preform.

(Component of Gas Barrier Layer)

A component for forming the gas barrier layer contained in the multi-layer container of the present invention is not particularly limited and a known resin having gas barrier property may be used. The component for forming the gas barrier layer is preferably one satisfying the following oxygen transmission coefficient. Examples thereof include: a polyamide resin such as a m-xylylene group-containing polyamide resin (MX nylon resin); an ethylene-vinyl acetate copolymer resin; a polyacrylonitrile resin; a polyvinylidene chloride resin; and polyglycolic acid (PGA). One kind thereof may be used alone, or two or more kinds thereof may be used in combination. Of those, a polyamide resin is preferred and a m-xylylene group-containing polyamide resin is more preferred from the viewpoints of gas barrier property and recycling property.

The phrase "having gas barrier property" used herein means that a layer itself forming a gas barrier layer has an oxygen transmission coefficient of 1.0 cc·mm/(m$^2$·day·atm) or less under the condition of a temperature of 23° C. and a relative humidity of 80% RH during molding into a multi-layer container. The oxygen transmission coefficient is preferably 0.8 cc·mm/(m$^2$·day·atm) or less, more preferably 0.20 cc·mm/(m$^2$·day·atm) or less, still more preferably 0.15 cc·mm/(m$^2$·day·atm), particularly preferably 0.09 cc·mm/(m$^2$·day·atm) or less. When the resin having gas barrier property may be used as the gas barrier layer, the resultant multi-layer container has satisfactory gas barrier performance, which can contribute to the extension of the deadline to consume contents to be preserved.

The m-xylylene group-containing polyamide resin (MX nylon resin) preferred as the component for forming the gas barrier layer is preferably polyamide (hereinafter, referred to as "polyamide (B)") obtained by subjecting a diamine component including 70 mol % or more of m-xylylenediamine and a dicarboxylic acid component including 50 mol % or more of an α,ω-linear aliphatic dicarboxylic acid having 4 to 20 carbon atoms to polycondensation. The polyamide (B) has high barrier performance, exhibits excellent characteristics in coinjection moldability and costretch blow moldability with the polyester (A), and has satisfactory moldability.

The diamine component in the polyamide (B) contains preferably 70 mol % or more, more preferably 75 mol % or more, still more preferably mol % or more of m-xylylenediamine. When the content of m-xylylenediamine in the diamine component is 70 mol % or more, the polyamide (B) exhibits satisfactory gas barrier property.

A diamine component that may be used for the diamine component excluding m-xylylenediamine in the polyamide (B) is exemplified by: aliphatic diamines such as tetramethylenediamine, pentamethylenediamine, 2-methylpentamethylenediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decaline, and bis(aminomethyl)tricyclodecane; and diamines each having an aromatic ring, such as bis(4-aminophenyl)ether, p-phenylenediamine, p-xylylenediamine, and bis(aminomethyl)naphthalene, but is not limited thereto.

The dicarboxylic acid component in the polyamide (B) contains preferably 50 mol % or more, more preferably 70 mol % or more, still more preferably 80 mol % or more of an α,ω-linear aliphatic dicarboxylic acid having 4 to 20 carbon atoms. When the content of the α,ω-linear aliphatic dicarboxylic acid falls within the above-mentioned range, the polyamide exhibits excellent gas barrier property and moldability. Examples of the α,ω-linear aliphatic dicarboxylic acid having 4 to 20 carbon atoms include aliphatic dicarboxylic acids such as succinic acid, glutaric acid, pimelic acid, suberic acid, azelaic acid, adipic acid, sebacic acid, undecanedioic acid, and dodecanedioic acid. Of those, adipic acid and sebacic acid are preferred.

Further, there are given, as the dicarboxylic acid excluding the α,ω-linear aliphatic dicarboxylic acid in the polyamide (B), aromatic dicarboxylic acids such as terephthalic acid, isophthalic acid, and 2,6-naphthalenedicarboxylic acid.

A dicarboxylic acid component including 100 to 50 mol % of the α,ω-linear aliphatic dicarboxylic acid having 4 to 20 carbon atoms and 0 to 50 mol % of an aromatic dicarboxylic acid is preferably used as the dicarboxylic acid component in the polyamide (B).

The polyamide (B) may be manufactured by a melt polycondensation method. For example, the polyamide is manufactured by a method including heating a nylon salt formed of m-xylylenediamine and adipic acid under pressure in the presence of water and polymerizing the nylon salt in a molten state while removing water added and condensation water. Further, the polyamide is also manufactured by a method including directly adding m-xylylenediamine to adipic acid in a molten state and subjecting the mixture to polycondensation under normal pressure. In this case, in order to keep a reaction system in a homogenous liquid state, polycondensation is carried out by continuously adding m-xylylenediamine to adipic acid while raising the temperature of a reaction system so that the reaction temperature does not fall below the melting point each of oligoamide and polyamide to be produced. It should be noted that a small amount of a monoamine or a monocarboxylic acid may be added as a molecular weight adjustor during a polycondensation reaction.

Further, the polyamide (B) may be manufactured by a melt polymerization method and then subjected to polycondensation by a solid-phase polymerization. A manufacturing method for the polyamide is not particularly limited and the polyamide is manufactured by a conventionally known method under a conventionally known polymerization condition.

The above-mentioned MX nylon resin has a relative viscosity of generally suitably 1.5 or more, preferably 2 to 4, more preferably 2.1 to 3.5. It should be noted that the relative viscosity is a viscosity in the case where a solution obtained by dissolving 1 g of a resin in 100 ml of 96% sulfuric acid is measured at 25° C. using a Cannon-Fenske viscometer or the like.

The polyamide (B) has a number average molecular weight of preferably 18,000 to 43,500, more preferably 20,000 to 30,000. When the number average molecular weight falls within the range, molding into a multi-layer molded article is performed satisfactorily, and a multi-layer container to be obtained exhibits excellent delamination resistance. It should be noted that, when the polyamide (B) has a number average molecular weight of 18,000 to 43,500, the polyamide (B) has a relative viscosity of about 2.3 to 4.2, and when 20,000 to 30,000, about 2.4 to 3.2.

A phosphorus compound may be added to the polyamide (B) in order to enhance processing stability during melt molding or to prevent the polyamide (B) from being colored. The phosphorus compound to be preferably used is a phosphorus compound including an alkali metal or an alkaline-earth-metal. Examples thereof include alkali metal salts or alkaline earth metal salts, such as sodium, magnesium, or calcium salts, of phosphoric acid, hypophosphorous acid, and phosphorous acid. In particular, a phosphorus compound using an alkali metal salt or an alkaline earth metal salt of hypophosphorous acid is preferably used because it is particularly excellent in coloration preventing effect of the polyamide. The concentration of the phosphorus compound in the polyamide (B) is preferably 1 to 500 ppm, more preferably 350 ppm or less, still more preferably 200 ppm or less in terms of phosphorus atom. Even when the concentration of the phosphorus atom exceeds 500 ppm, the coloration preventing effect reaches a plateau. Further, when the concentration of the phosphorus atoms is 500 ppm or less, there is no risk that a film obtained by utilizing the polyamide (B) having added thereto the phosphorus compound has an excessively high haze value.

Another polyamide may be added to the polyamide (B) for the purpose of improving delamination resistance. Examples of the another polyamide include: aliphatic polyamides such as homopolymers including poly(6-aminohexanoic acid) (PA-6) also known as poly(caprolactam), poly(hexamethylene adipamide) (PA-6,6), poly(7-aminoheptanoic acid) (PA-7), poly(10-aminodecanoic acid) (PA-10), poly(11-aminoundecanoic acid) (PA-11), poly(12-aminododecanoic acid) (PA-12), poly(hexamethylene sebacamide) (PA-6,10), poly(hexamethylene azelamide) (PA-6,9), and poly(tetramethylene adipamide) (PA-4,6), a caprolactam/hexamethylene adipamide copolymer (PA-6,6/6)) and a hexamethylene adipamide/caprolactam copolymer (PA-6/6,6); and amorphous semiaromatic polyamides such as poly(hexamethylene isophthalamide) (PA-6I), a hexamethylene isophthalamide/hexamethylene terephthalamide copolymer (PA-6I/6T), poly(m-xylylene isophthalamide) (PA-MXDI), a caprolactam/m-xylylene isophthalamide copolymer (PA-6/MXDI), and a caprolactam/hexamethylene isophthalamide copolymer (PA-6/6I), but is not limited thereto.

The gas barrier layer is preferably mainly formed of the polyamide (B), and from the viewpoint of gas barrier performance, the polyamide (B) is included in an amount of more preferably 70 mass % or more, still more preferably 80 mass % or more, particularly preferably 90 mass % or more.

The gas barrier layer may be blended with one or more kinds of other resins such as polyester, olefin, and phenoxy resins as long as the effect of the present invention is not remarkably impaired.

Further, there may added additives such as: inorganic fillers such as a glass fiber and a carbon fiber; plate-like inorganic fillers such as a glass flake, talc, kaolin, mica, montmorillonite, and an organic clay; impact resistance modifiers such as various elastomers; crystal nucleating agents; lubricants such as a fatty acid amide-based compound, a fatty acid metal salt-based compound, and a fatty acid amide-based compound; antioxidants such as a copper compound, an organic or inorganic halogen-based compound, a hindered phenol-based compound, a hindered amine-based compound, a hydrazine-based compound, a sulfur-based compound, and a phosphorus-based compound; heat stabilizers; anticoloring agents; UV absorbents such as a benzotriazole-based UV absorbent; mold release agents; plasticizers; colorants; flame retarders; and a compound containing cobalt metal serving as a compound for imparting oxygen scavenging capability and an alkali compound for preventing gelation of polyamide.

(Mold for Multi-Layer Container)

In the multi-layer container of the present invention, the multi-layer container may be manufactured using the following mold without employing any molding method involving a special apparatus, which increases a production cost, and a complicated step. Hereinafter, the mold is described in detail.

A mold for a multi-layer container according to the present invention (hereinafter, sometimes simply referred to as "mold") includes: a cold-half portion (I) including a cavity; and a hot-half portion (II) including a first resin flow path for connecting the interior of a first injection cylinder to the cavity, a second resin flow path for connecting the interior of a second injection cylinder to the cavity, and a junction portion of the first resin flow path and the second resin flow path, in which the junction portion included in the hot-half portion (II) is positioned upstream of a gate portion opened to the cavity in the cold-half portion (I), and the second resin flow path includes means for partially inhibiting a resin flow.

It should be noted that the term "upstream" used herein means the side of an injection cylinder and the term "downstream" means the side of a cavity.

Figure 1:
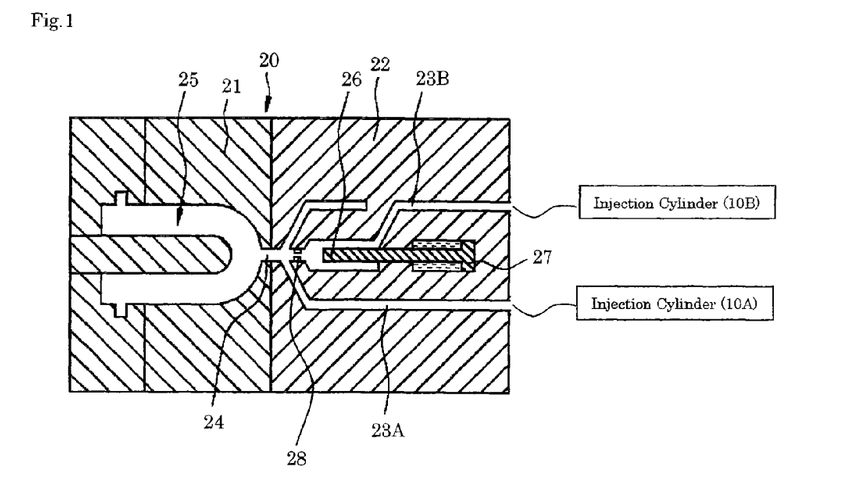
FIG. 1 is a conceptual diagram of a mold used in Example 1 under a state in which no injection molding is carried out in the mold.

The mold of the present invention is a mold to be used for an apparatus for molding a multi-layer container and includes a hot-half portion (22) and a cold-half portion (21) as illustrated in FIG. 1, for example. The hot-half portion (22) has a pipe through which a molten and plasticized resin flows while keeping its molten state by virtue of a screw of an injection molding apparatus. The hot-half portion (22) has a first resin flow path (23A) for connecting the interior of a first injection cylinder (10A) to a cavity (25), a second resin flow path (23B) for connecting the interior of a second injection cylinder (10B) to the cavity (25), and a junction portion at which the first resin flow path (23A) and the second resin flow path (23B) are joined together. The second resin (for example, the polyamide (B)) as the component for forming the gas barrier layer of the multi-layer container flows through the second resin flow path (23B). The first resin (for example, the "resin excluding the component for forming the gas barrier layer," such as the polyester (A)) as the component for forming the outermost layer and the innermost layer flows through the first resin flow path (23A). It should be noted that the first resin may have gas barrier property.

The cold-half portion (21) is a portion in which a molten and plasticized resin is injected, cooled, and molded into a multi-layer container. The cold-half portion (21) has at least one or more cavities therein.

Figure 2:
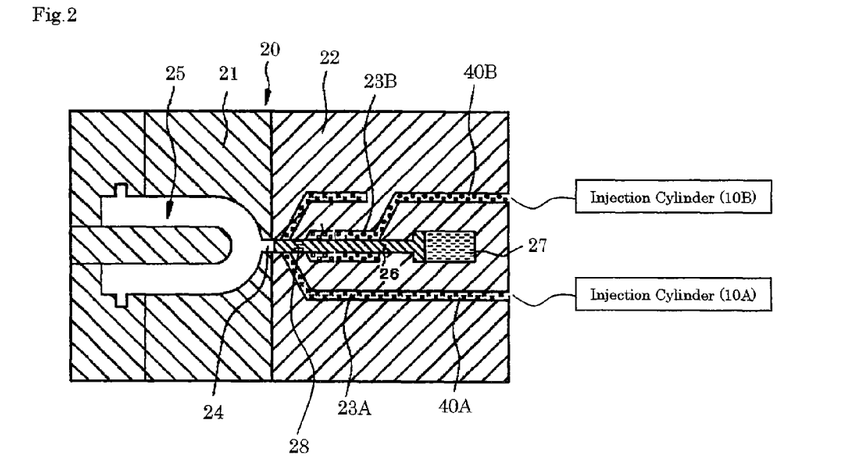
FIG. 2 is a conceptual diagram of the mold used in Example 1 under a state just before molding a multi-layer container in the mold.
Figure 3:
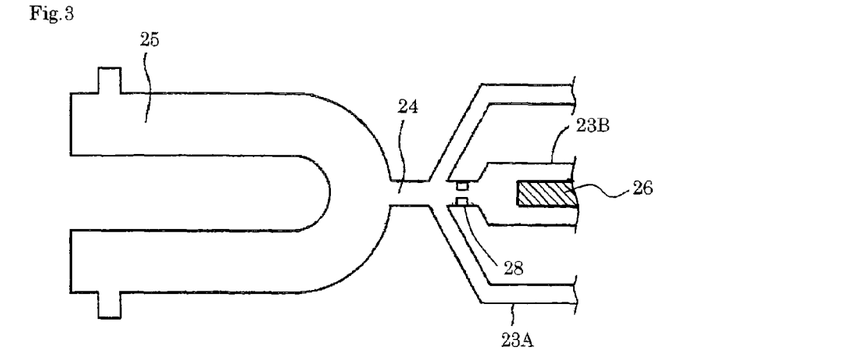
FIG. 3 is a conceptual diagram of the vicinity of a cavity for illustrating a position at which means for partially inhibiting a resin flow is provided in the mold used in Example 1.

A general structure of a mold for a multi-layer molding apparatus is found in, for example, Japanese Patent Application Laid-open No. Hei 11-165330, Japanese Patent Application Laid-open No. Sho 63-99918, and Japanese Patent Translation Publication No. 2001-504763. The mold of the present invention has means for partially inhibiting a resin flow (28) in the second resin flow path (23B) of the hot-half portion (22) of the mold (see FIGS. 1 to 3).

It is preferred that the pipe shape of each of flow path cross-sections in the case of cutting the first resin flow path (23A) and the second resin flow path (23B) of the mold of the present invention in a plane vertical to the resin flow direction be circular. However, the pipe shape is not limited to such shape, and any shape such as a rectangular shape may be adopted.

Figure 8:
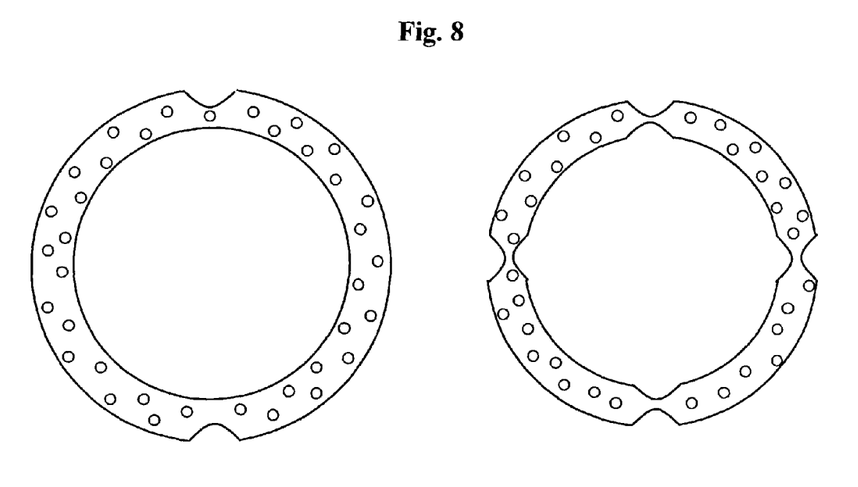
FIG. 8 is a schematic view of a second resin layer (gas barrier layer) in a cross-section of a multi-layer container molded using the mold of the present invention.

In the mold of the present invention, a site whose layer thickness is reduced owing to the inhibition of a resin flow, specifically, a site (concave portion) having a thickness 0.01 to 0.9 times as large as the maximum thickness of the second resin layer as described above may be produced in part of the second resin layer (gas barrier layer) of the resultant multi-layer container by providing the means for partially inhibiting a resin flow in the second resin flow path (23B). It should be noted that FIG. 8 illustrates one aspect of the cross-section shape of the second resin layer (gas barrier layer) in the multi-layer container molded using the mold of the present invention.

Figure 4:
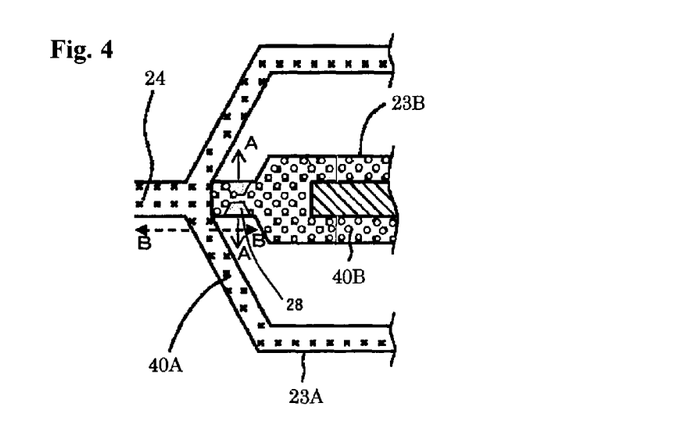
FIG. 4 is a conceptual diagram of the vicinity of a junction portion of a first resin flow path and a second resin flow path for illustrating a position at which the means for partially inhibiting a resin flow is provided in a mold of the present invention.
Figure 9:
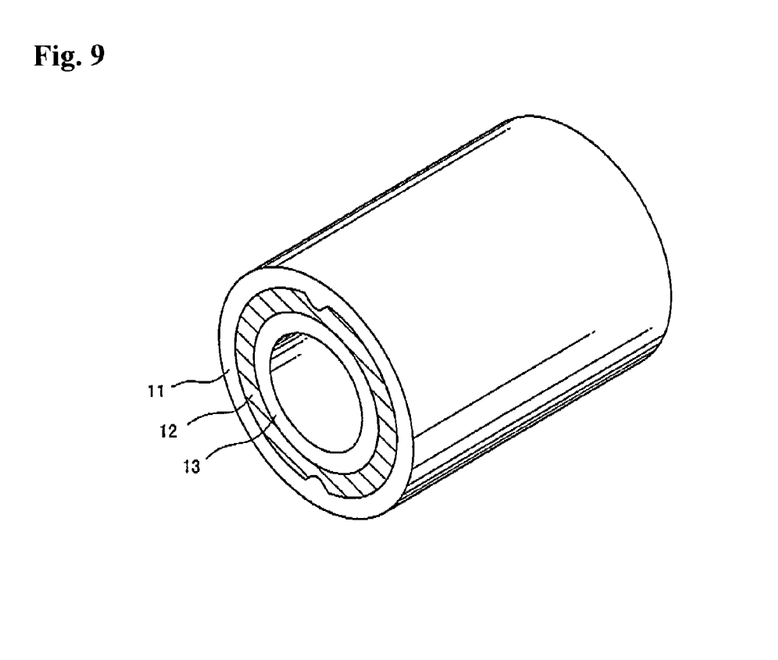
FIGS. 9 and 10 are cross sectional views of preform structures having three layers of the present invention including the second resin layers (gas barrier layer) depicted in FIG. 8.
Figure 10:
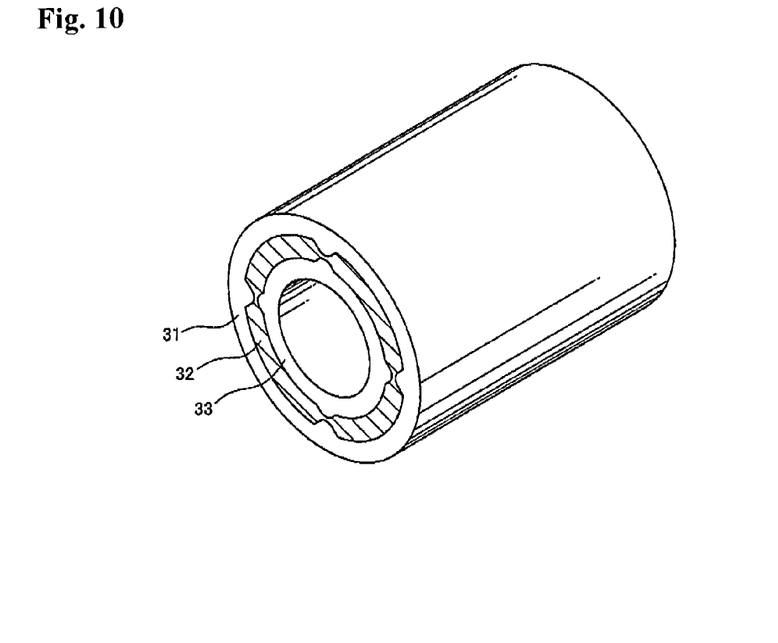

FIGS. 9 and 10 show cross sectional views of preform structures having different embodiments of three layer structures of the present invention. These preforms include a gas barrier layer (12, 32) between an innermost layer (13, 33) and an outermost layer (11, 31) in the FIGS. 9 and 10. The shape of the gas barrier layers of FIGS. 9 and 10 is the same as that of FIG. 8. The mold of the present invention has means for partially inhibiting a resin flow (28) as shown in FIGS. 1 and 4. When the second resin for the gas barrier layer is introduced into the first resin, some parts of the second resin are shaved by means for partially inhibiting a resin flow (28). Then, the concave portions of the gas barrier layer (12, 32) are formed.

As described above, the delamination of the multi-layer container is suppressed by allowing the thickness in the circumferential direction of the second resin layer of the multi-layer container to fluctuate. In general, a fluctuation in thickness leads to an increase in surface area, which appears to promote delamination. However, a shape in which the first resin layer drove a wedge in the second resin layer resulted in an effect opposite to what was expected. This is probably because such shape improved the impact followability of the second resin layer to the first resin layer in the case where a stress such as an impact is applied onto the multi-layer container, which contributed to an improvement in delamination resistance of the multi-layer container.

In the mold of the present invention, the means for partially inhibiting a resin flow provided in the second resin flow path (23B) is provided on the side wall of the second resin flow path (23B). The number of the means to be provided is preferably 2 or more, more preferably 3 or more, still more preferably 4 or more from the viewpoint of improving the impact followability of the second resin layer to the first resin layer to enhance delamination resistance. The upper limit value of the number of the means to be provided is not particularly limited but is preferably 15 or less, more preferably 12 or less, still more preferably 10 or less, particularly preferably 8 or less from the viewpoint of improving the impact followability of the second resin layer to the first resin layer to enhance delamination resistance. Accordingly, from the same viewpoint, the number of the means for partially inhibiting a resin flow to be provided is preferably 2 to 15, more preferably 2 to 12, still more preferably 3 to 12, yet still more preferably 3 to 10, even yet still more preferably 4 to 10, particularly preferably 4 to 8.

In the mold of the present invention, the means for partially inhibiting a resin flow is preferably provided in the second resin flow path (23B) between the junction portion of the first resin flow path (23A) and the second resin flow path (23B) and the second injection cylinder (10B). In this case, it is particularly preferred that the means for partially inhibiting a resin flow be positioned in the vicinity of the above-mentioned junction portion and be provided preferably 0 to 5 cm, more preferably 0 to 3 cm, still more preferably 0 to 1 cm, particularly preferably 0 to 0.5 cm upstream of the junction portion. When the means for partially inhibiting a resin flow is provided in the above-mentioned range, it is easy to allow the thickness in the circumferential direction of the second resin layer of the resultant multi-layer container to fluctuate.

Further, when two or more means for partially inhibiting a resin flows are provided, the means may be provided at a distance identical to or different from each other from the junction portion at which the second resin flow path (23B) and the first resin flow path (23A) are joined together.

Figure 5A:
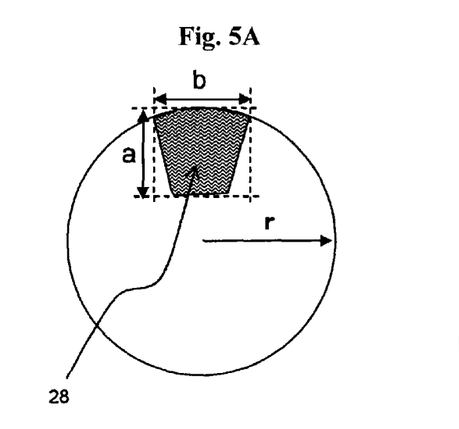
FIG. 5A is a schematic view of a cross-section taken along the arrow A-A direction of FIG. 4 of the means for partially inhibiting a resin flow of the mold of the present invention.

FIG. 4 illustrates one aspect of the mold of the present invention. The shape of the means for partially inhibiting a resin flow is described. FIG. 5A is a conceptual diagram illustrating the shape of a cross-section in the direction vertical to the resin flow direction of the resin flow path of the means for partially inhibiting a resin flow (cross-section taken along the A-A direction of FIG. 4) (it should be noted that only one means for partially inhibiting a resin flow is illustrated in the figure).

When the longest portion in the diameter direction and the longest portion in the circumferential tangential direction of the cross-section (vertical direction) of the means for partially inhibiting a resin flow have a length of a mm and a length of b mm, respectively, it is preferred that a and b of the means for partially inhibiting a resin flow satisfy the following expressions, respectively, from the viewpoint of delamination resistance. It should be noted that the length a of the longest portion in the diameter direction has a perpendicular relationship with the length b of the longest portion in the circumferential tangential direction. It should be noted that r represents a radius of the second resin flow path and is preferably 0.5 to 5 mm, more preferably 0.5 to 4 mm, still more preferably 1 to 3 mm.

$$0.01r \leq a \leq 1r$$

$$0.01r \leq b \leq 1r$$

The lower limit value of a is preferably 0.03r, more preferably 0.05r, still more preferably 0.1r. The upper limit value of a is preferably 0.9r, more preferably 0.8r, still more preferably 0.7r.

Further, the lower limit value of b is preferably 0.03r, more preferably 0.05r, still more preferably 0.1r. The upper limit value of b is preferably 0.9r, more preferably 0.8r, still more preferably 0.7r.

It should be noted that the shape of a cross-section taken along the direction vertical to the resin flow direction of the resin flow path of the means for partially inhibiting a resin flow is not particularly limited, and for example, the shape of a portion excluding a surface in contact with the flow path is a circle, a semicircle, or a polygon or a rectangle such as a triangle, a quadrangle, or a trapezoid (see FIGS. 6A-6D).

Figure 5B:
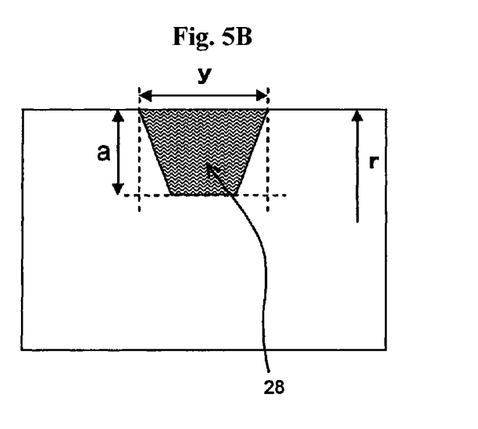
FIG. 5B is a schematic view of a cross-section taken along the arrow B-B direction of FIG. 4 of the means for partially inhibiting a resin flow of the mold of the present invention.
Figure 6A:
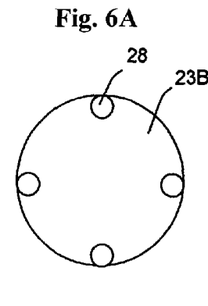
FIGS. 6A to 6B are each a schematic view of a cross-section taken along the arrow A-A direction of FIG. 4 of one aspect of the means for partially inhibiting a resin flow of the mold of the present invention, and it should be noted that FIG. 6B is a schematic view of a mold in which a resin flow path 23A is also provided in the central portion of a resin flow path 23B, and means for partially inhibiting a resin flow is also provided in the circumferential portion of the resin flow path 23A at the central portion of the resin flow path 23B.
Figure 6B:
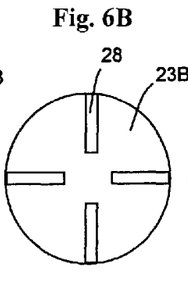
Figure 6C:
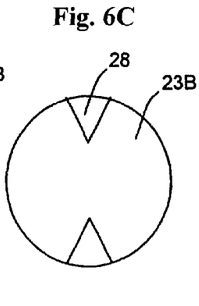
Figure 6D:
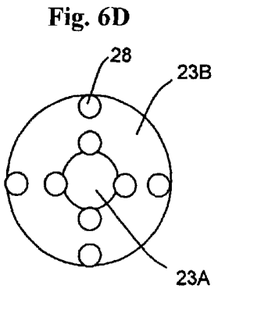

Next, FIG. 5B is a conceptual diagram illustrating the shape of a cross-section taken along the direction parallel to the resin flow direction of the resin flow path of the means for partially inhibiting a resin flow (taken along the B-B direction of FIG. 4) (it should be noted that only one means for partially inhibiting a resin flow is illustrated in the figure).

When the longest portion in the diameter direction and the longest portion of the cross-section (parallel direction) of the means for partially inhibiting a resin flow have a length of a mm and a length of y mm, respectively, it is preferred that a and y of the means for partially inhibiting a resin flow satisfy the following expressions, respectively, from the viewpoint of delamination resistance. It should be noted that the length a of the longest portion in the diameter direction has a perpendicular relationship with the length y of the longest portion in the parallel direction to the resin flow path. It should be noted that r has the same definition as described above, and the preferred range for r is also the same.

$$0.01r \leq a \leq 1r$$

$$0.01r \leq y \leq 2r$$

The lower limit value of a is preferably 0.03r, more preferably 0.05r, still more preferably 0.1r. The upper limit value of a is preferably 0.9r, more preferably 0.8r, still more preferably 0.7r. Any combination of the respective lower limit value and the upper limit value may be selected.

The lower limit value of y is preferably 0.03r, more preferably 0.05r, still more preferably 0.1r. The upper limit value of y is preferably 1.8r, more preferably 1.5r. Any combination of the respective lower limit value and the upper limit value may be selected.

It should be noted that the shape of a cross-section taken along the direction parallel to the resin flow direction of the resin flow path of the means for partially inhibiting a resin flow is not particularly limited, and for example, the shape of a portion excluding a surface in contact with the flow path is a circle, a semicircle, or a polygon or a rectangle such as a triangle, a quadrangle, or a trapezoid.

In the means for partially inhibiting a resin flow, when the a, b, and y fall within the above-mentioned range, there is a tendency that the impact followability of the second resin layer to the first resin layer is improved to further enhance delamination resistance.

The entire shape of the means for partially inhibiting a resin flow of the mold of the present invention may be, for example, linear, acicular, rod-like, plate-like, columnar, semicolumnar, or globular, or may be triangular pyramidal, rectangular, cubic, conical, or trapezoidal. Further, the shape is not limited to those shapes.

Further, a material for forming the means for partially inhibiting a resin flow is not particularly limited, and for example, may be the same metal material as that for a mold, may be a metal such as iron, aluminum, copper, or zinc, or may be a thermosetting resin having adhesion property to the metal.

[Manufacturing Method for Multi-Layer Container]

The present invention also provides the following manufacturing method for a multi-layer container:

a manufacturing method for a multi-layer container including a laminate structure of three or more layers having at least a gas barrier layer between an innermost layer and an outermost layer, in which the gas barrier layer in a site formed of the laminate structure has a site having a thickness ($t_1$) 0.01 to 0.9 times as large as the maximum thickness ($t_0$) of the gas barrier layer, the method including carrying out molding using the mold for a multi-layer container; and a manufacturing method for a multi-layer container including a laminate structure of three or more layers having at least a gas barrier layer between an innermost layer and an outermost layer, in which the gas barrier layer in a site formed of the laminate structure has a site having a thickness ($t_1$) 0.01 to 0.9 times as large as the maximum thickness ($t_0$) of the gas barrier layer, the method including: forming a multi-layer preform using the mold for a multi-layer container; and then blow molding the multi-layer preform.

As described above, the multi-layer container of the present invention may be manufactured using the mold for a multi-layer container according to the present invention. Specifically, the multi-layer container may be manufactured by injecting the polyester (A) from an injection cylinder on the side of the first resin flow path (23A) and injecting a resin having gas barrier property (gas barrier resin) from an injection cylinder on the side of the second resin flow path (23B) through the hot-half portion (22) into the cavity (25) of the cold-half portion (21) using an injection molding machine having two injection cylinders.

In the multi-layer container of the present invention, a multi-layer container molded using the mold of the present invention may be used without any treatment, or a multi-layer container (for example, a multi-layer container partially having a laminate structure of three layers or five layers) obtained by molding a multi-layer preform (for example, a preform partially having a laminate structure of three layers or five layers) using the mold of the present invention and then carrying out heat treatment and blow molding may also be used. In particular, a multi-layer container obtained by blow molding a multi-layer preform is preferred. Examples of the multi-layer container include a multi-layer bottle and a multi-layer cup.

A manufacturing method for a multi-layer preform having a laminate structure of three layers or five layers is not particularly limited, and a known method is utilized. For example, a multi-layer preform of a three-layer structure (first resin layer/second resin layer/first resin layer) may be manufactured by, in the step of injecting a resin for forming each of an innermost layer and an outermost layer from an injection cylinder on the side of the first resin flow path (23A) and injecting a resin for forming a gas barrier layer from an injection cylinder on the side of the second resin flow path (23B), continuously injecting the first resin and simultaneously injecting a necessary amount of the second resin, and then stopping the injection of the first resin. Further, a multi-layer preform of a three-layer structure (first resin layer/second resin layer/first resin layer) may be manufactured by, with use of a mold in which the first resin layer flows into the center of the second resin layer (see FIG. 6D), continuously injecting the first resin and simultaneously injecting a necessary amount of the second resin, and then stopping the injection of the first resin.

Further, a multi-layer preform of a five-layer structure (first resin layer/second resin layer/first resin layer/second resin layer/first resin layer) may be manufactured by, in the step of injecting a first resin for forming each of an innermost layer and an outermost layer from an injection cylinder on the side of the first resin flow path (23A) and injecting a second resin from an injection cylinder on the side of the second resin flow path (23B), first injecting the first resin, then injecting the second resin alone, and finally injecting the first resin to fill the cavity (25).

It should be noted that the manufacturing method for a multi-layer preform is not limited to only the above-mentioned method.

The multi-layer preform obtained by carrying out molding using the mold of the present invention may be further subjected to biaxial stretch blow molding and molded into a multi-layer container. For example, it is preferred that the surface of the multi-layer preform be heated to 90 to 110° C. and subjected to blow molding during biaxial stretch blowing. The heating temperature is more preferably 95° C. to 108° C. When the heating temperature falls within the range, satisfactory blow moldability is obtained, a first resin layer (polyester (A) layer) forming each an outermost layer and an innermost layer does not undergo whitening due to cold stretch, a second resin layer (gas barrier layer) does not undergo whitening due to crystallization, and additionally satisfactory delamination resistance is obtained. It should be noted that the surface temperature may be measured using an infrared radiation thermometer. The measurement may be generally carried out by setting the emissivity set to 0.95. By the way, in the case of heating the surface of the multi-layer preform, in general, the heating is preferably carried out with several or more heaters, and the heater output balance is also important. It is preferred that a proper heater output balance and heating time be adjusted as appropriate with the use of an outside air temperature or a heating temperature of the surface of the multi-layer preform.

The multi-layer container molded using the mold of the present invention is satisfactory in moldability and hardly undergoes delamination due to falling and impact. Further, delamination hardly occurs even in a shape including uneven and bending portions, and hence the shape of the multi-layer container is not limited to a shape having little uneven and bending portions, leading to an increase in degree of design freedom. The multi-layer container of the present invention is suitable for storing and preserving various articles such as: liquid beverages including carbonated beverages, juice, water, milk, beer, wine, sake, whiskey, shochu, coffee, tea, jelly beverages, and healthy beverages; seasonings including liquid seasonings, sauces, soy sauce, dressings, and soup stocks; liquid food items including liquid soups; liquid pharmaceutical products; skin lotions; milky lotions; hair dressings; hair dyes; and shampoos.

EXAMPLES

Hereinafter, the present invention is described in more detail based on examples with reference to the drawings. However, the present invention is by no means limited to those examples. It should be noted that each multi-layer container manufactured in each example or comparative example was evaluated in accordance with the following methods.

(1) Evaluation Method for Delamination Resistance

The delamination height of a container was determined by a falling test based on an ASTM D2463-95 Procedure B and used as an indicator of delamination resistance. First, a multi-layer container was filled with water and capped. After that, the multi-layer container was allowed to fall down from any height and the presence or absence of delamination was assessed visually. In this case, the multi-layer container was allowed to fall down in the vertical direction so that the bottom of the multi-layer container came into contact with a floor. An interval for a falling height was set to 15 cm and the total number of test containers was set to 30.

It should be noted that a larger delamination height indicates more satisfactory delamination resistance.

(2) Measurement Method for Oxygen Transmission Rate (OTR)

The oxygen transmission rate (OTR) of a multi-layer container was determined in accordance with ASTM D3985 and used as an indicator of gas barrier property. Specifically, an oxygen transmission rate [cc/(bottle·day·0.21 atm)] under the conditions of 23° C. and 100% RH inside of a bottle and 50% RH outside of the bottle was measured using an oxygen transmission rate measurement apparatus (manufactured by Modern Controls, Inc., type: OX-TRAN 2/61).

It should be noted that a lower numerical value indicates a smaller oxygen transmission amount and higher gas barrier property.

(3) Measurement Method for Maximum Thickness ($t_0$) of Gas Barrier Layer and Thickness ($t_1$) of Concave Portion of Multi-Layer Container A multi-layer container was cut into round slices each having a thickness of 1 cm from the bottom ground site. Then, iodine tincture was applied onto each cross-section. A gas barrier layer is stained with iodine tincture and observed to be colored reddish brown or black. The cross-section was observed with a digital microscope manufactured by KEYENCE CORPORATION and measured for its thickness to determine $t_0$ and $t_1$.

Example 1

Figure 7A:
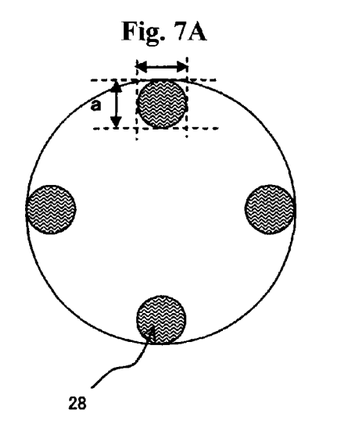
FIGS. 7A and 7B are schematic views of cross-sections taken along the arrow A-A direction and the arrow B-B direction, respectively, of FIG. 4 of a shape of the means for partially inhibiting a resin flow of the mold in Example 1.
Figure 7B:
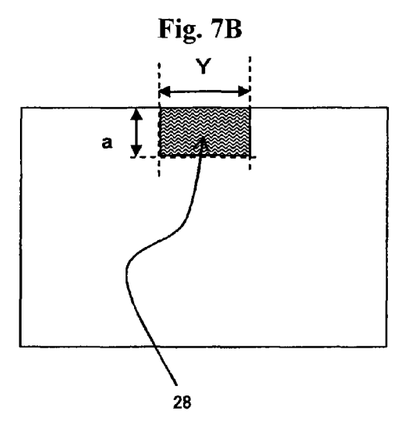

The above-mentioned mold (20) illustrated in FIG. 1 was used. As illustrated in FIG. 7A, four columnar (diameter: 0.2 mmΦ, length: 3 mm) means for partially inhibiting a resin flow (component; the same metal as the mold) having the same shape were provided on the side wall of the second resin flow path (23B) 0.1 cm upstream of the junction portion of the first resin flow path (23A) and the second resin flow path (23B) of the mold (20) so that the means were arranged on the side wall of the resin flow path at regular intervals.

A shape of means for partially inhibiting a resin flow: columnar, r=1.5 mm

A cross-section taken along the direction vertical to a resin flow path: a=0.2 mm, b=0.2 mm A cross-section taken along the direction parallel to a resin flow path: a=0.2 mm, y=3.0 mm Polyethylene terephthalate ("RT543C" manufactured by Japan Unipet Co., Ltd., intrinsic viscosity: 0.75 dl/g) was used as a first resin for an outermost layer and an innermost layer. Further, polyamide MXD6 (N-MXD6, "MX nylon 56007" manufactured by MITSUBISHI GAS CHEMICAL COMPANY, INC., relative viscosity: 2.70, oxygen transmission rate: 0.1 cc·mm/m²·day·atm) was used as a second resin for a gas barrier layer.

With use of the above-mentioned mold (20) and an injection molding machine (type: M200, four-shot molding) manufactured by Meiki Co., Ltd., under the following conditions, a three-layer preform which was formed of a "first resin layer/second resin layer/first resin layer" and had a total length of 95 mm, an outer diameter of 22 mm, a wall of thickness 4.2 mm, and a weight of 27 g was injection molded by continuously injecting a first resin and simultaneously injecting a second resin, and then stopping the injection of the first resin, followed by cooling.

Next, the resultant three-layer preform was subjected to biaxial stretch blow molding under the following conditions to afford a multi-layer container which had a total length of 223 mm, an outer diameter of 65 mm, and an internal volume of 500 ml, and had a petaloid type bottom shape. The conditions for the blow molding were described below.

Table 1 shows the evaluation results of the resultant multi-layer container.

(Injection Molding Conditions for Three-Layer Preform)
Injection cylinder temperature on first resin flow path side: 270° C.

Injection cylinder temperature on second resin flow path side:
260° C.
Resin flow path temperature in mold: 270° C.
Temperature of cooling water for mold: 15° C.
Ratio of second resin in multi-layer preform: 5 mass %
(Biaxial Stretch Blow Molding Conditions)

| Blow molding machine: | Model "EFB1000ET" (manufactured by Frontier, Inc.) |
|---|---|
| Heating temperature of preform: | 101° C. |
| Stretching rod pressure: | 0.5 MPa |
| Primary blow pressure: | 0.7 MPa |
| Secondary blow pressure: | 2.5 MPa |
| Primary blow retardation time: | 0.34 sec |
| Primary blow time: | 0.30 sec |
| Secondary blow time: | 2.0 sec |
| Blow exhaust time: | 0.6 sec |
| Mold temperature: | 30° C. |

Example 2

A multi-layer container was obtained in the same manner as in Example 1 except that the means for partially inhibiting a resin flow in the mold was changed to one having a shape described in Table 1. Table 1 shows the evaluation results of the resultant multi-layer container.

Production Example 1

Synthesis of poly-m-Xylylene sebacamide (N-MXD10))

Sebacic acid (manufactured by Itoh Oil Chemicals Co., Ltd., TA grade) was molten with heating at 170° C. in a reaction can. After that, while the content was stirred and m-xylylenediamine (manufactured by MITSUBISHI GAS CHEMICAL COMPANY, INC.) was gradually added dropwise thereto so that the molar ratio of m-xylylenediamine and sebacic acid was 1:1, the temperature was raised to 240° C. by heating. After the completion of the dropwise addition, the temperature was raised to 260° C. by further heating.

After the completion of the reaction, the content was collected in a strand form and pelletized with a pelletizer. The resultant pellet was loaded into a tumbler and subjected to solid-phase polymerization under reduced pressure to afford poly-m-xylylene sebacamide (hereinafter, referred to as "N-MXD10") having an adjusted molecular weight. N-MXD10 had a melting point of 191° C., a glass transition point of 60° C., a number average molecular weight of 23,000, and an oxygen transmission coefficient of 0.8 cc·mm/m²·day·atm.

Comparative Example 1

A multi-layer container was obtained in the same manner as in Example 1 except that the means for partially inhibiting a resin flow in the mold was not provided in the resin flow path 2. Table shows the evaluation results of the resultant multi-layer container.

Example 3

A multi-layer container was obtained in the same manner as in Example 1 except that: the means for partially inhibiting a resin flow in the mold was changed to one having a shape described in Table 1; polylactic acid (PLA, manufactured by UNITIKA, LTD., TERRAMAC grade TP-4000) was used as the first resin; and poly-m-xylylene sebacamide (N-MXD10) obtained in Production Example 1 was used as the second resin. Table 1 shows the evaluation results of the resultant multi-layer container.

Comparative Example 2

A multi-layer container was obtained in the same manner as in Example 3 except that the means for partially inhibiting a resin flow in the mold was not provided in the resin flow path 2. Table shows the evaluation results of the resultant multi-layer container.

Example 4

A multi-layer container was obtained in the same manner as in Example 1 except that the means for partially inhibiting a resin flow in the mold was changed to one having a shape described in Table 1 (changed to one with a=0.63 mm). Table 1 shows the evaluation results of the resultant multi-layer container.

TABLE 1

| | | | Example 1 | Example 2 | Comparative Example 1 | Example 3 | Comparative Example 2 | Example 4 |
|---|---|---|---|---|---|---|---|---|
| Radius r of second resin flow path (mm) | | | 1.5 | 1.5 | 1.5 | 1.5 | 1.5 | 1.5 |
| Means for partially inhibiting resin flow | Number of means to be provided | | 4 | 5 | 0 | 3 | 0 | 4 |
| | Position at which means is provided (cm)[1] | | 0.1 | 0.2 | — | 1.1 | — | 0.1 |
| | Shape | | Columnar | Semicolumnar | — | Rectangular | — | Columnar |
| | Cross-section in vertical direction[2] | Cross-section shape | Circle | Semicircle | — | Rectangle | — | Circle |
| | | a (mm) | 0.2 | 0.05 | — | 0.5 | — | 0.2 |
| | | b (mm) | 0.2 | 0.03 | — | 0.1 | — | 0.2 |
| | | a/r value | 0.13 | 0.03 | — | 0.33 | — | 0.13 |
| | | b/r value | 0.13 | 0.02 | — | 0.07 | — | 0.13 |
| | Cross-section in parallel direction[3] | Cross-section shape | Rectangle | Rectangle | — | Rectangle | — | Rectangle |
| | | a (mm) | 0.2 | 0.05 | — | 0.5 | — | 0.63 |
| | | y (mm) | 3 | 1 | — | 2 | — | 3 |
| | | a/r value | 0.13 | 0.03 | — | 0.33 | — | 0.42 |
| | | y/r value | 2.00 | 0.67 | — | 1.3 | — | 2.00 |
| | First resin | | PET | PET | PET | PLA | PLA | PET |
| | Second resin | | N-MXD6 | N-MXD6 | N-MXD6 | N-MXD10 | N-MXD10 | N-MXD6 |
| Measurement results and | Maximum thickness of gas barrier layer $t_0$/μm | | 34 | 36 | 35 | 30 | 30 | 34 |

TABLE 1-continued

| | | Example 1 | Example 2 | Comparative Example 1 | Example 3 | Comparative Example 2 | Example 4 |
|---|---|---|---|---|---|---|---|
| evaluation results | Thickness of concave portion of gas barrier layer $t_1$/μm | 24 | 32 | — | 10 | — | 4 |
| | $t_1/t_0$ | 0.71 | 6.89 | 1 | 0.33 | 1 | 0.12 |
| | Oxygen transmission rate [cc/(bottle · day · 0.21 atm)] | 0.01 | 0.009 | 0.009 | 0.12 | 0.12 | 0.01 |
| | Delamination height (cm) | 310 | 300 | 180 | 295 | 170 | 320 |

[1] a distance from a junction portion of a first resin flow path and a second resin flow path
[2] a cross-section taken along the direction vertical to a resin flow direction of a resin flow path
[3] a cross-section taken along the direction parallel to the resin flow direction of a resin flow path Table 1 revealed that the multi-layer container molded using a mold including means for partially inhibiting a resin flow according to the present invention exhibited very excellent delamination resistance, whereas the multi-layer container molded using a mold not including means for partially inhibiting a resin flow was poor in delamination resistance.

INDUSTRIAL APPLICABILITY

The multi-layer container of the present invention is satisfactory in moldability and hardly undergoes delamination due to falling and impact. Further, delamination hardly occurs even in a shape including uneven and bending portions, and hence the shape of the multi-layer container is not limited to a shape having little uneven and bending portions, leading to an increase in degree of design freedom. The multi-layer container of the present invention is suitable for storing and preserving various articles such as: liquid beverages including carbonated beverages, juice, water, milk, beer, wine, sake, whiskey, shochu, coffee, tea, jelly beverages, and healthy beverages; seasonings including liquid seasonings, sauces, soy sauce, dressings, and soup stocks; liquid food items including liquid soups; liquid pharmaceutical products; skin lotions; milky lotions; hair dressings; hair dyes; and shampoos.

EXPLANATION OF THE CODES

20 Mold
21 Cold-Half Portion
22 Hot-Half Portion
23A, 23B Resin Flow Path
24 Gate Portion
25 Cavity
26 Gate Cut Pin
27 Air cylinder
28 Means for Partially Inhibiting Resin Flow
40A, 40B Molten Resin
a The longest portion in the diameter direction of the cross-section (A-A direction) of the means for partially inhibiting a resin flow
b The longest portion in the circumferential tangential direction of the cross-section (A-A direction) of the means for partially inhibiting a resin flow
y The longest portion of the cross-section (parallel direction) of the means for partially inhibiting a resin flow

What is claimed is:

1. A multi-layer container, comprising a laminate structure of three or more layers having at least a gas barrier layer between an innermost layer and an outermost layer, wherein the gas barrier layer in a site formed of the laminate structure has a continuously concave portion having a thickness 0.01 to 0.9 times as large as a maximum thickness of the gas barrier layer.

2. The multi-layer container according to claim 1, wherein a mass of the site formed of the laminate structure equals 30 mass % or more of a mass of an entire multi-layer container.

3. The multi-layer container according to claim 1, wherein the laminate structure comprises a laminate structure of three layers or five layers.

4. The multi-layer container according to claim 1, wherein the gas barrier layer is formed of at least one component selected from the group consisting of a polyamide resin, an ethylene-vinyl acetate copolymer resin, a polyacrylonitrile resin, a polyvinylidene chloride resin, and a polyglycolic acid.

5. The multi-layer container according to claim 4, wherein the gas barrier layer is formed of at least one polyamide resin comprising a m-xylylene group-containing polyamide resin.

6. The multi-layer container according to claim 1, wherein the laminate structure comprises an innermost layer and an outermost layer each formed of at least one component selected from the group consisting of a thermoplastic polyester resin, a thermoplastic copolymer polyester resin, a polyolefin-based resin, an aliphatic polyamide resin, a polycarbonate resin, a polyacrylonitrile resin, a polyvinyl chloride resin, and a polystyrene resin.

7. The multi-layer container according to claim 1, further comprising a bottle body.

8. A manufacturing method for the multi-layer container of claim 1, the method comprising molding a container with a mold comprising:
a cold-half portion (I) comprising a cavity; and
a hot-half portion (II) comprising a first resin flow path for connecting an interior of a first injection cylinder to the cavity, a second resin flow path for connecting an interior of a second injection cylinder to the cavity, and a junction portion of the first resin flow path and the second resin flow path,
wherein
the junction portion in the hot-half portion (II) is positioned upstream of a gate portion opened to the cavity included in the cold-half portion (I), and
the second resin flow path comprises an inhibitor for partially inhibiting a resin flow.

9. A manufacturing method for the multi-layer container of claim 1 the method comprising:
forming a multi-layer preform with a mold comprising:
a cold-half portion (I) comprising a cavity; and
a hot-half portion (II) comprising a first resin flow path for connecting an interior of a first injection cylinder to the cavity, a second resin flow path for connecting an interior of a second injection cylinder to the cavity, and a junction portion of the first resin flow path and the second resin flow path, wherein the junction portion in the hot-half portion (II) is positioned upstream of a gate portion opened to the cavity included in the cold-half portion (I), and the second resin flow path comprises an inhibitor for partially inhibiting a resin flow; and then blow molding the multi-layer preform.

10. The multi-layer container according to claim 2, wherein the laminate structure comprises a laminate structure of three layers or five layers.

11. The multi-layer container according to claim 2, wherein the gas barrier layer is formed of at least one component selected from the group consisting of a polyamide resin, an ethylene-vinyl acetate copolymer resin, a polyacrylonitrile resin, a polyvinylidene chloride resin, and a polyglycolic acid.

12. The multi-layer container according to claim 11, wherein the gas barrier layer is formed of at least one polyamide resin comprising a m-xylylene group-containing polyamide resin.

13. The multi-layer container according to claim 2, wherein the laminate structure comprises an innermost layer and an outermost layer each formed of at least one component selected from the group consisting of a thermoplastic polyester resin, a thermoplastic copolymer polyester resin, a polyolefin-based resin, an aliphatic polyamide resin, a polycarbonate resin, a polyacrylonitrile resin, a polyvinyl chloride resin, and a polystyrene resin.

14. The multi-layer container according to claim 2, further comprising a bottle body.

\* \* \* \* \*